J. J. RIGBY.
METHOD OF PRODUCING A SEAMLESS RING MEMBER AND APPLYING IT TO THE EDGE OF AN ARTICLE.
APPLICATION FILED JUNE 17, 1909.
968,804.
Patented Aug. 30, 1910.
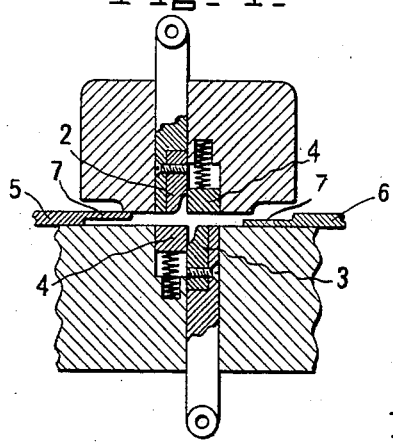
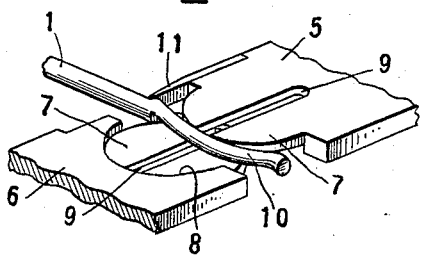
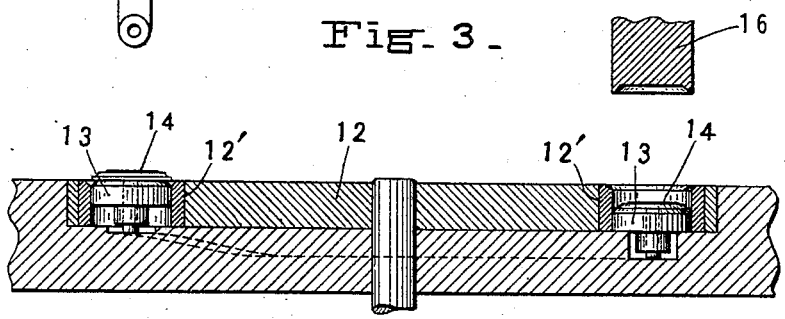
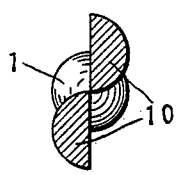
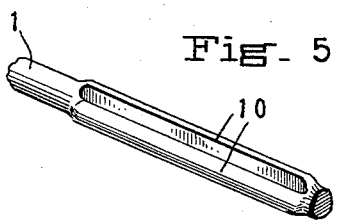
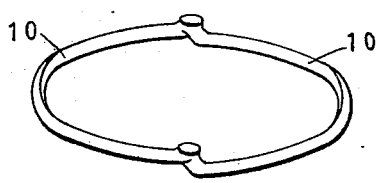
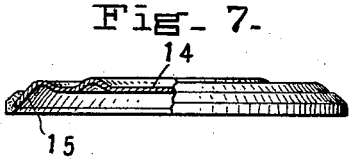
WITNESSES:
J. Clyde Ripley.
Philip S. McLean.
INVENTOR
John J. Rigby.
BY
Brock Becken Smith
ATTORNEYS.

UNITED STATES PATENT OFFICE.

JOHN J. RIGBY, OF BROOKLYN, NEW YORK.

METHOD OF PRODUCING A SEAMLESS RING MEMBER AND APPLYING IT TO THE EDGE OF AN ARTICLE.

968,804.   Specification of Letters Patent.   Patented Aug. 30, 1910.

Application filed June 17, 1909. Serial No. 502,690.

*To all whom it may concern:*

Be it known that I, JOHN J. RIGBY, a citizen of the United States, and a resident of Brooklyn, in the county of Kings and State of New York, have invented a certain new and useful Method of Producing a Seamless Ring Member and Applying It to the Edge of an Article, of which the following is a specification.

My invention relates generally to the method of producing a seamless ring member and applying it to the edge of an article, such, for instance, as a solder ring which is used on the edge of a can cap.

In the art as now practiced the solder is generally introduced into a die in which it is curled or bent and properly shaped, after which the cap to be edged is introduced at the top of the solder ring. The can cap thus produced has a disconnected or broken solder ring which is apt to become displaced during shipment. Sometimes the solder ring is produced from a comparatively wide ribbon of solder by stamping out a continuous or seamless ring which is then properly shaped and applied to a cap by placing the latter on top of the ring and subjecting the parts to action of suitable dies. This method involves the waste of a great deal of solder and it is on that account objectionable. Moreover, in both cases the solder ring is applied partially on the inside of the cap, which is very objectionable from a sanitary point of view.

The object of this invention is to produce a seamless or continuous ring blank in an efficient and economical manner, avoiding waste of material and applying the ring blank so produced to the edge of an article, such as a can cap, without causing the solder to extend on the inside of the dependent flange of the can cap.

To this end the invention comprises the method of forming a seamless ring member which consists in splitting the wire or strand of material substantially throughout its length, leaving the ends unsplit, and then spreading and shaping the split portion into a continuous ring. The splitting of the wire will cause the split portions thereof to stand in different planes so that they may be readily spread and shaped. The ring thus produced is applied to the article by placing it on top of the said article and subjecting the parts to the action of suitable dies which will cause the solder ring to be securely attached to the exterior of the dependent flange of the cap and to the under edge thereof, without, however, projecting up on the interior of the flange of the cap.

In the accompanying drawings is illustrated suitable mechanism for carrying out my invention, but I do not limit myself to the particular form of apparatus shown. Changes may be made in the method itself without departing from the spirit and scope of the invention, and the various steps comprising the invention, such as the particular method of producing the continuous ring blank and the method of applying it to the article, may be considered either separately or collectively.

In the drawings: Figure 1 is a detail sectional view of the splitting and spreading mechanism. Fig. 2 is a perspective view of the spreading and shaping mechanism as about to act upon a split strand of material, and the cutter as about to sever the material into the proper length. Fig. 3 is a sectional view of the dies and punch mechanism for applying the ring blanks to the articles. Fig. 4 is a sectional view of the material after it has been split. Fig. 5 is a perspective view of the split portions of the strand of material. Fig. 6 is a view of the ring blank after being acted upon by the shaping and spreading mechanism. Fig. 7 is a view partly in elevation and partly in section, of an article, such as a can cap, with the ring blank applied thereto.

The mechanisms for carrying out the various steps of my invention are shown in detached relation to one another, but it will of course be understood that these various mechanisms may, and preferably would be combined all in the same machine, preferably in the manner shown in a co-pending application filed May 4, 1908, Serial No. 430,732.

Similar reference characters indicate like parts throughout the several views.

The strand of material 1, which may be of any shape but which is here shown as circular in cross section, in the form of a wire, is first acted upon by the splitting mechanism which here consists of a pair of cutting members 2 and 3 disposed oppositely to, but out of alinement with each other. This wire of course may be of any material other than solder, according to the use to which the ring blank is to be applied. The cutting members are reciprocated by suitable means, such as cams (not illustrated), and in connection with the splitting mechanism it is usually desirable to employ means for stripping the split material from the splitting mechanism. The stripping means in the present instance consists of spring seated plungers 4, disposed alongside the cutting members. The strand of material after being split is acted upon by the spreading and shaping mechanism. In the present instance this spreading and shaping mechanism consists of two sliding members 5 and 6, having a reciprocating motion at right angles to the movement of the splitting mechanism. These spreading members have oppositely disposed spreading and shaping projections 7, adapted to register with the corresponding recesses 8 of the two members. The action of the shaping members is best illustrated in Fig. 2. On account of the shearing action of the cutting members, the split portions 10 of the strand of material are offset from one another, substantially as shown in Fig. 4. As will be seen in Fig. 2, these offset split portions are engaged by the spreading projections of the opposite shaping members. After being acted upon by the spreading means the material is shaped in the form of a ring, substantially as shown in Fig. 6. The shaping members are preferably provided with grooves 9 to permit the stripping member to enter and hold the ring while the members separate, thereby allowing the blank to be removed from the shaping and spreading mechanism. Mounted on one of the spreading members is a knife 11, adapted to sever the material at the proper point so as to leave the split portions connected by two unsplit end portions. This knife is preferably positioned so as to act upon the material after the spreading and shaping mechanism has obtained a grip upon the split portions of the material. The continuous ring blank so produced may be applied to the can cap or other article by suitable die mechanism, such as that illustrated in Fig. 3. This mechanism consists of a dial 12 which is rotated by suitable power, and contains a series of die-openings 12′, in which are seated supporting pads 13. The articles to be edged, such as the can caps 14, are placed upon the supporting pads, and the ring blanks are then fed on top of the flange 15 of the cap. The plunger 16, upon its descent engages the solder ring and the can cap, and in combination with the die, so shapes the ring as to cause it to engage the upper surface of the cap flange and the under edge thereof, substantially as shown in Fig. 7.

In the present instance it will be noted that the ring blank is only partly shaped by the spreading and shaping mechanism, it being preferred to complete the shaping by the dies which apply the blank to the cap. It is apparent, however, that the ring blank can be given such final shape as may be desired by the shaping mechanism. The final shaping of the ring by the action of the punch removes all effects of the manner in which the ring is produced. The word "ring" as used in this specification and accompanying claims, is not employed in a narrow sense. The shape of the so-called ring need not be circular, since by properly shaping the parts, any desired configuration of blank may be obtained.

In so far as certain of the claims are concerned, it is immaterial how the seamless ring blank is produced, and in reference to certain other claims, it is immaterial how the ring blank is applied to the article. Thus, the applicant intends to cover the feature of placing the ring blank on top of the cap and then forcing it into contact therewith, irrespective of the method of producing the ring blank, as well as the feature of splitting and spreading the material to form a ring, irrespective of the method of applying it to the article.

What is claimed is:

1. The method of producing a ring member and applying it to the edge of an article, which consists in splitting a strand of material substantially throughout its length, leaving the ends of the strand unsplit, then spreading and shaping the split portions into a continuous ring, and then applying said ring to the edge of the article.

2. The method of producing a ring member and applying it to the edge of an article, which consists in splitting a strand of material substantially throughout its length, leaving the ends of the strand unsplit, then spreading and shaping the split portions into a continuous ring, then placing said ring on top of the article to be edged, and then subjecting the ring and article to the action of dies.

3. The herein described method which consists in splitting a strand of material, severing the material so as to leave the split portions connected by unsplit end portions, spreading said split portions to form a continuous ring, placing said continuous ring on top of the article to be edged, and then subjecting the ring and article to the action of dies.

4. The herein described method, consisting in forming a continuous ring from a strand of material, placing an article in a die, placing said ring on top of said article in engagement with the edge of the article, and actuating the die to bring the ring into locking engagement with the lower edge and outer surface of the article.

Signed at New York city in the county of New York and State of New York this 2nd day of June A. D. 1909.

JOHN J. RIGBY.

Witnesses:
    AXEL V. BEEKEN,
    PHILIP S. McLEAN.